Sept. 1, 1931.    K. E. PEILER    1,821,664
CONVEYER GUIDE
Filed Aug. 29, 1925
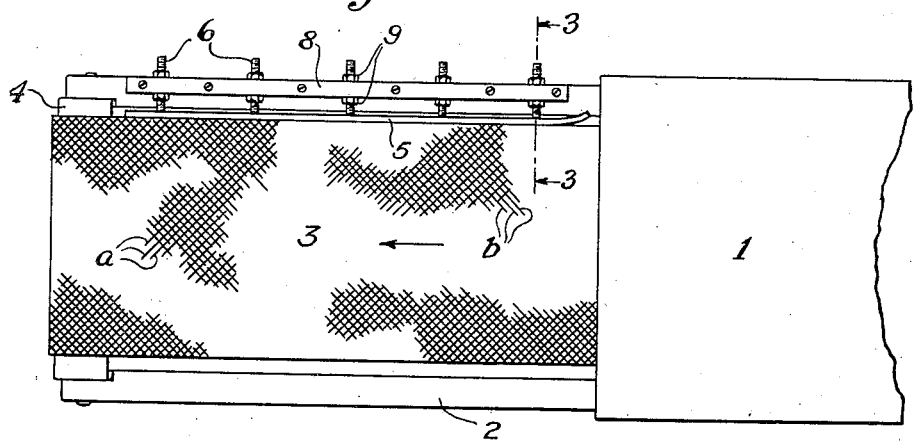
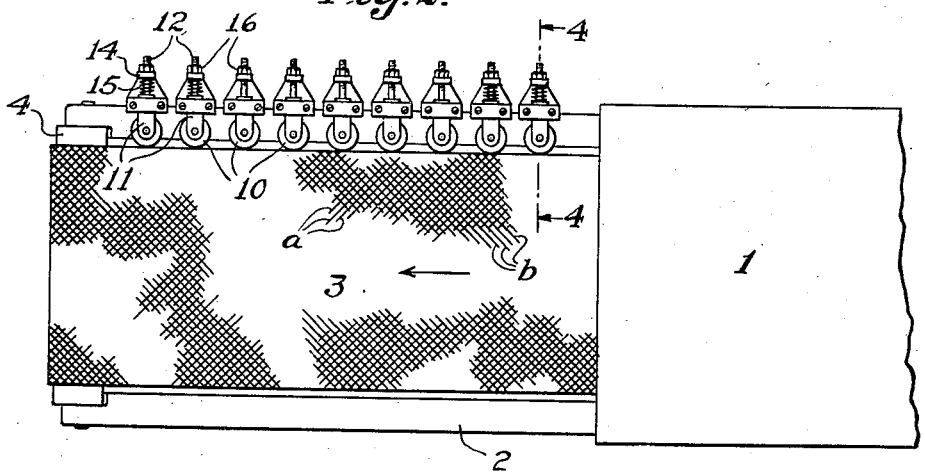
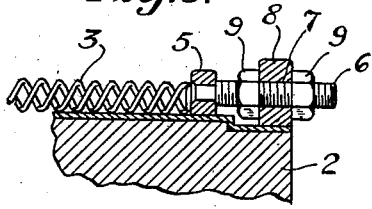
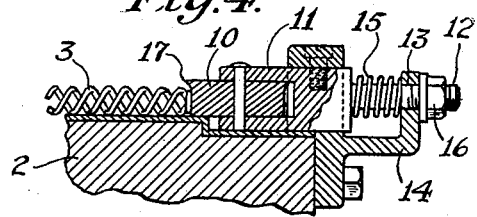
Inventor
Karl E. Peiler
by Robert D. Brown
Attorney.

Patented Sept. 1, 1931

1,821,664

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

CONVEYER GUIDE

Application filed August 29, 1925. Serial No. 53,417.

This invention relates to conveyers and it has particular relation to endless conveyer belts constructed of a series of interconnected helically wound wires.

It has been found that a conveyer of the character described has a tendency to creep to one side of the driving roll around which it passes.

One of the objects of this invention is to oppose this lateral creeping tendency of the belt, by providing a guide adjacent to the edge of the belt toward which the belt tends to creep, this guide being adapted to maintain the belt in operative position with respect to the driving rolls or other supports with which the belt may be associated.

In the accompanying drawings:

Figure 1 is a plan view of a conveyer equipped with a guiding member constructed in accordance with the invention;

Fig. 2 is a similar view of a modified form of the invention;

Fig. 3 is an enlarged fragmentary cross sectional view taken on line 3—3 of Fig. 1; and Fig. 4 is a similar view taken on line 4—4 of Fig. 2.

Referring to the drawings, the invention is illustrated in connection with a lehr for annealing glassware, only the exit end of which is shown, and which briefly comprises a tunnel 1, a sorting table 2, a conveyer 3 of woven wire fabric having ribbed upper and lower surfaces, indicated by the inclined lines $a$ and $b$ respectively, in Figs. 1 and 2. The ware-bearing strand of the conveyer upon emerging from the tunnel 1 traverses the table 2 and passes over a roll 4, any desired means being used for driving the belt. If the belt has what is termed a right-hand weave, it is caused to creep to the right or toward the top in Figs. 1 and 2, and in order to prevent such creepage, a flexible bar 5 is positioned at the edge of the belt (Fig. 1). This bar is provided with screw threaded studs 6 at suitable intervals, which pass through holes 7 provided in a bar 8 carried by the table. Check nuts 9 are threaded upon the studs 6 one on each side of the bar 8, to permit the bar to be adjusted toward and from the edge of the conveyer. By reason of the flexibility of the bar 5, it may be sprung slightly so as to engage the conveyer near the point where it emerges from the tunnel with a slight pressure and force the conveyer gradually into proper relation to the roll 4.

In the modification shown in Fig. 2, a series of rollers 10 bear against the edge of the conveyer. Each roller is mounted in a block 11 which is slidably mounted on the edge of the table. The block 11 is provided with a screw threaded stud 12 which passes through a hole 13 formed in a bracket 14 carried by the table. The block 11 and the roller 10 carried thereby are yieldably urged toward the conveyer by a spring 15 which surrounds the stud 12 between the block and the bracket 14. The roller may be adjusted toward and from the conveyer by a nut 16 which is threaded upon the stud 12.

A series of these rollers are arranged along the edge of the conveyer as close together as convenient and in order that the rollers may act gradually and progressively upon the conveyer, the nuts 16 are adjusted so that the first roller to engage the conveyer, as it emerges from the tunnel, exerts a slight pressure against the conveyer and each of the succeeding rollers forces the conveyer over further until it is properly positioned.

The rollers 10 are preferably provided with slight flanges 17 overhanging the top of the conveyer (Fig. 4) to prevent it from riding up on the rollers.

In order to provide continuous contact between the edge of the conveyer and the roller guide, an endless chain or belt may pass around all of the rollers, thereby providing a support for the conveyer between the rollers.

It will be apparent that the above described construction also permits different portions of the guiding means to yield independently of one another to accommodate irregularities in the edge of the conveyer, which might otherwise become torn or damaged if the guiding means were rigid.

In addition to the structural modifications herein shown and described, various other changes in the construction and arrangement of parts may be made without departing from the invention as set forth in the appended claims.

I claim:

1. The combination with an endless conveyer belt having a tendency to creep laterally with respect to its line of travel, of a flexible bar disposed adjacent to an edge of said belt for opposing such tendency, and a series of independent means for flexing various portions of said bar toward and away from said conveyer belt.

2. The combination with an endless conveyer belt having a tendency to creep laterally with respect to its line of travel, of a flexible member disposed adjacent to the edge of said belt for opposing such tendency, and a series of independent means for flexing various portions of said member toward and away from said belt.

Signed at Hartford, Conn., this 27th day of August, 1925.

KARL E. PEILER.